United States Patent [19]

Waitkus

[11] 3,839,289

[45] Oct. 1, 1974

[54] AMINOTRIAZINE-ALDEHYDE RESINS AND PROCESS FOR PREPARATION

[75] Inventor: Phillip A. Waitkus, Sheboygan, Wis.

[73] Assignee: Plastics Engineering Company, Sheboygan, Wis.

[22] Filed: Mar. 8, 1972

[21] Appl. No.: 232,964

[52] U.S. Cl.......... 260/64, 117/126 AB, 117/155 L, 117/155 UA, 161/257, 260/29.4 R, 260/30.2, 260/31.8 N, 260/32.8 N, 260/33.6 R, 260/33.4 R, 260/65, 260/67.6 R, 260/67.6 C
[51] Int. Cl............................ C08g 9/24, C08g 9/30
[58] Field of Search....... 260/65, 64, 67.6 R, 67.6 C

[56] References Cited
UNITED STATES PATENTS
3,535,148  10/1970  Ravve...................... 117/93.31

*Primary Examiner*—Lester L. Lee
*Attorney, Agent, or Firm*—Walter J. Monacelli

[57] ABSTRACT

A polyamino triazine, such as melamine or benzoguanamine, etc., is reacted with an aldehyde such as formaldehyde, and a vinyl compound containing two active hydrogens capable of reaction with an aldehyde or alkylol group in such a manner as not to react with or destroy the vinyl group. Typical vinyl-containing compounds are acrylamide, diacetone acrylamide, allyl amine, etc. The resultant resins are capable of being cured by free radical catalysts through the vinyl group. The resulting crosslinked products have excellent electrical properties and are particularly useful as molding compositions for encapsulating electrical parts, and also as binders in fiber-reinforced plastics.

18 Claims, No Drawings

AMINOTRIAZINE-ALDEHYDE RESINS AND PROCESS FOR PREPARATION

BACKGROUND OF THE INVENTION

1. Field of the Invention

This invention relates to an improved resin composition and the process for preparation thereof. More specifically, it relates to a resin prepared by the reaction of a triazine compound containing two or more NH₂ groups by reaction with an aldehyde and an aldehyde reactible compound which also contains a vinyl group. Still more specifically, it relates to the production of resin compositions having vinyl groups therein capable of being crosslinked or cured by free radical-generating catalysts to produce products having excellent electrical properties.

2. State of the Prior Art

Aldehyde condensation reactions used in producing melamine-formaldehyde and benzoguanaminefor-maldehyde resins proceed by the elimination of a condensation product, mainly water. In the latter stages of resinification or curing, the elimination of the condensation product, i.e., water, becomes more difficult and the curing is retarded by the difficulty in the elimination of water. Incomplete curing and susceptibility to hydrolysis results in gradual degradation of electrical properties.

STATEMENT OF THE INVENTION

The resin of this invention comprises the reaction product of an amino-1,3,5-triazine compound containing two or more NH₂ groups, particularly melamine and benzoguanamine, with an aldehyde, preferably formaldehyde, and a compound having a vinyl group and at least two active hydrogens capable of reacting with an aldehyde or an alkylol group. This vinyl-containing compound can be represented by the formula

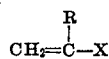

wherein:

R is preferably hydrogen but can also be a group which does not affect the ability of the double bond to enter into free radical addition reactions, such as an alkyl group of one to four carbon atoms, an aryl radical of six to eight carbon atoms such as phenyl, totyl, xylyl or an aryl radical having one or two chloro or bromo atoms attached to the aromatic nucleus, and X represents a group having two or more active hydrogens therein capable of reacting with the aldehyde or an alkylol radical such as

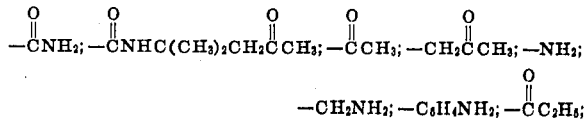

etc., and also contains a vinyl group of formula

wherein R is hydrogen or an alkyl group of one to four carbon atoms, such as methyl, ethyl, propyl and butyl.

Diacetone acrylamide and acrylamide are preferred compounds, but also suitable for this purpose are vinyl amine, allyl amine, vinyl aniline, 2-amino propene, methyl vinyl ketone, ethyl vinyl ketone, methyl allyl ketone, etc. With such compounds the aldehyde is first reacted with the amino or keto-activated methyl group leaving the vinyl group free and available for subsequent free radical-generated cross-linking.

The proportion of the vinyl-containing compound can vary depending on the amount of cross-linking through free radical generation desired in the ultimate composition. For most purposes, 0.05–100 moles, preferably 0.1 to 10 moles of the vinyl-containing compound may be used per mole of melamine or benzoguanamine. The amount of formaldehyde or other aldehyde is in the range of 0.5–6 moles of formaldehyde or other aldehyde per mole of melamine, etc., preferably 1.5–2.5, and also an additional amount of 0.5–5, preferably 1.5–3 moles of formaldehyde or other aldehyde, or aldehyde producing material, per mole of vinyl compound.

The condensation of the aldehyde with the amino groups is favored by basic conditions, preferably a pH of 7–8 initially, and toward the latter stages a pH in the range of 10–12.

The condensation is also favored by a reaction temperature of 60°–100° C., preferably about 85°–95° C. When the reaction has advanced to a stage where a drop of the reaction mass placed in cold water (15° C.) will produce a slightly opaque cloud, the pH is adjusted to 10–11.5 and water removed from the reaction mass by reducing the pressure, gradually if necessary, to remove water by distillation at a controllable rate. This is continued until the resultant resin reaches a stage where it is hard and brittle enough to be ground to powder when cooled. This stage can be judged either by removing and cooling a sample or by determining when the gradient bar melting point has reached about 180°–200° C.

The resins produced by the aldehyde condensation within the ratios specified may be either solid or liquid and are miscible in various solvents, depending upon the specific composition. Solvents which are preferred, depending on the particular resin composition, include water, diallyl phthalate, styrene, divinyl benzene, triallyl cyanurate, diallyl itaconate, chlorostyrene, methyl methacrylate, butyleneglycoldimethacrylate, and various alcohols and ketones such as methanol, ethanol, isopropanol, acetone, methyl vinyl ketone, etc.

Solutions of the resins may be used to impregnate paper, cloth, asbestos or other reinforcing fibers, woven, or non-woven, by various methods known in the art. In the impregnation step free radical initiating catalysts such as benzoyl peroxide, dicumyl peroxide, etc., may be included in the solution to effect ultimate optimum cure in the molding or laminating cycle. The resulting treated web or fabric may then be dried to a tack-free but uncured state and stacked with other such sheets for ultimate molding or laminating for forming articles of various shapes such as sheet stock and dishware. Various pressures may be used in the molding cycle although 50 to 1,000 psi are generally favored.

Because of the high speed of the free radical reactions, the molded articles may be manufactured at much faster production rates than for aldehyde conensation moldings. These products can be made without special provision for elimination of water or other volatile materials as is generally required in condensation reactions to assure sound, void-free parts. Moreover, the resins of this invention offer distinct advantages over the processing of conventional unsaturated polyester resins. These new resins require only steam heated reactors in contrast to the more complicated special boiler equipment required to produce high temperature conditions necessary for polyester processing. Moreover, the resin processing is more economical for these new resins since the cycle time generally does not exceed 6 hours, whereas standard polyester reactions required 14–20 hours for completion.

The condensation reaction by which the resins of this invention are produced may be illustrated as follows:

$$H_2N-Z-NH_2 + 2CH_2O + CH_2=C(R)-X \longrightarrow$$

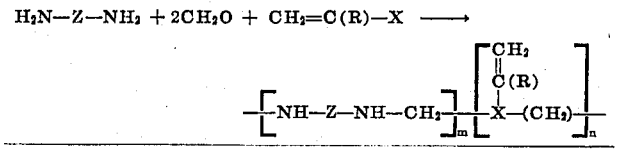

wherein

Z represents the triazine nucleus $C_3N_3-NH_2$ or $C_3N_3-C_6H_5$ as in melamine or benzoguanamine respectively;

R and X are defined above; and m and n are each integers having a value of at least 2 and their values are governed by the relative proportions of diamino and vinyl compounds used as well as the molecular weight to which the condensation reactions are conducted. The vinyl-containing repeating units may be interspersed at random between the amino-containing repeating units.

Depending on the proportions of various reagents used, the number of the respective repeating units in the resulting polymer will vary accordingly. If a high proportion of melamine to diacetone acrylamide is used, then there will be in the polymer molecure a number of melamine groups bridged together by methylene radicals thereby forming a linear chain of melamine groups connected by methylene groups and periodically, in accordance with the proportion of diacetone acrylamide used, there will appear the corresponding diacetone acrylamide repeating unit. If the proportion of formaldehyde to other components is high enough, crosslinkages between polymer chains may be effected between melamine radicals in two or more linear chains. As noted above, the vinyl groups in the repeating units shown above are available for free radical crosslinking.

The polymerization reaction may be illustrated more specifically by the reaction of melamine and diacetone acrylamide with formaldehyde in the ratio of one mole of melamine and two moles of formaldehyde per mole of diacetone acrylamide. The resulting polymer chain can be represented as follows:

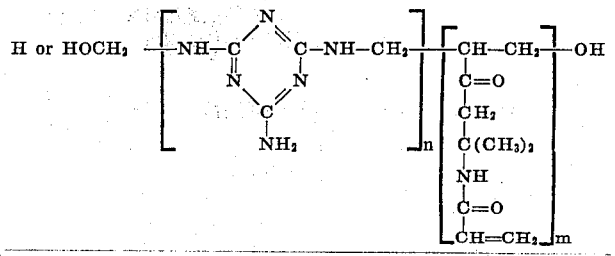

The values of n and m should be approximately equal and the actual values depend on the extent to which the condensation reaction is continued.

While the repeating unit derived from the diacetone acrylamide is shown in the formula as having both valence bonds for attachment to methylene groups attached to the terminal carbon of the diacetone acrylamide, it is also possible that these bonds may be formed by replacement of hydrogen from the amido nitrogen and the methylene group next to the keto group. However, since these groups are both adjacent to the

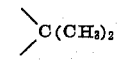

group and exposed to steric hindrance therefrom it is believed that the attachments are more likely to the terminal carbon as indicated. In any case it is intended that the above formula embraces possible attachments to these other sites. It is also intended that the respective repeating units may appear in various arrangements including regular alternation, random arrangement and with blocks of either appearing periodically.

It is possible also that a terminal repeating unit may have a hydrogen atom retained in place of the $CH_2OH$ group shown above.

Since the diacetone acrylamide is relatively more expensive than the other components, it is generally preferable to use only as much as is capable of producing the desired crosslinking results. Generally 0.1–0.5 moles per mole of melamine is sufficient Likewise the other vinyl-containing components may also be used in minor proportion particularly where they are relatively expensive.

Fillers and modifiers can be used in such compositions including inorganic and organic fillers such as silica, wood flour, clays, diatomaceous earths, or fibrous fillers such as fibers of glass, asbestos, sisal, carbon, metals, etc., plasticizers or lubricants, such as zinc or calcium stearate, polyamide waxes, graphite, molybdenum disulfide, montan wax, carnuba wax, etc., pigment and coloring agents, such as carbon black and numerous hydrocarbon soluble organic dyes, as well as inorganic pigments such as titanium dioxide, cadmium yellow, etc. Curing agents including the various free radical generating catalysts such as the peroxy and azo compounds well known in the art for this purpose. Particularly suitable for this purpose are benzoyl, t-butyl, dicumyl, lauroyl peroxides, etc., t-butyl hydroperoxide, t-butyl perbenzoate, azobisisobutyronitrile, etc. Generally 0.05–10 percent, preferably 0.1–5 percent catalyst is sufficient for the purpose.

It is also particularly advantageous to use 1–50 percent, preferably 5–30 percent of a polymerizable monomer as a solvent and to copolymerize the monomer and resin of this invention. Polymerizable monomer solvents suitable for this purpose are styrene, diallyl phthalate, divinyl benzene, triallyl cyanurate, diallyl itaconate, chlorostyrene, methyl vinyl ketone, acrylates such as methyl methacrylate, ethyleneglycol dimethacrylate, trimethylolpropane trimethacrylate, 1,3-butyleneglycol dimethacrylate, allyl methacrylate, etc.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

Melamine-Diacetone Acrylamide-Formaldehyde Resin

Into a 4-liter flask equipped with mechanical stirrer, reflux condenser and thermometer there is introduced 1,500 gms. of 52 percent aqueous formaldehyde solution and 600 gms. of water. The pH of this solution is adjusted to 7–8 by the addition of 2.5 gms. of triethanol amine. Then there are added 1,240 gms. of melamine and 515 gms. of diacetone acrylamide. The resultant mixture is then heated to 90° C. and maintained at this temperature until tests show that a drop of this mixture when placed in a beaker of cold water (15° C.) forms a slightly opaque or opalescent cloud. When this point is reached, sodium hydroxide solution is added to adjust the pH of the solution to 10.5–11.5. The reflux condenser is then replaced with a distillation condenser and the distillate removed under a reduced pressure of 25 inches of mercury to a temperature of 90° C. The reaction is held at this temperature and reduced pressure until a resin is produced with has a gradient bar melting point of 200° F. This resin may be easily ground when cool and does not sinter upon standing at room temperature. The yield of resin is found to be 2516 gms. The Stroke cure method shows a cure of 135 seconds at 330° F. The addition of 3 percent benzoyl peroxide reduces the cure time by approximately 80 percent. The resin is moderately soluble in diallyl phthalate and triallyl cyanurate and slightly soluble in hydrocarbons such as styrene. It also exhibits very high solubility in water which is in contrast to the lack of water solubility in melamine resins prepared in an identical fashion but with the omission of the diacetone acrylamide. Upon testing, castings of the resin show excellent electrical resistance properties.

EXAMPLE II

Benzoguanamine-Diacetone Acrylamide-Formaldehyde Resin

Into a 4-liter flask equipped with a reflux condenser, thermometer and mechanical stirrer, there is introduced 1500 gms. of a 52 percent aqueous solution of formaldehyde and 600 gms. of water. The pH of the solution is adjusted to 7.2–7.6 by the addition of 2.5 gms. of triethanol amine. Then 515 gms. of diacetone acrylamide and 1,830 gms. of benzoguanamine are added. The mixture is then heated to 90° C. and held at this temperature until the free formaldehyde content of the solution analyzes to less than 2 percent. Then 11 gms. of 10 percent sodium hydroxide solution is added to adjust the pH to the range of 10.5–11.5. The reflux condenser is then replaced with a distillation condenser and distillation effected at 120° C. and a reduced pressure of 27 inches of mercury. This is continued until the melting point, determined by the gradient bar method, reaches 180° F. The resin is then discharged from the flask and allowed to cool. The yield is 2,721 gms. and the melting point is 188° F. This resin shows no signs of curing after five minutes heating at 300° F. However, upon addition of 3 percent benzoyl peroxide, the resin is cured in less than 20 seconds at 330° F. to a rigid solid state. The uncured resin is not water soluble, but is completely miscible in diallyl phthalate and has improved solubility in hydrocarbons such as sytrene as compared to the resin of Example I. Solutions of this resin in a solvent comprising equal parts of styrene and diallyl phthalate and containing 60 percent by weight resin cure with benzoyl peroxide to clear, almost colorless castings. However castings which employ diallyl phthalate as the only solvent are superior in color and strength to the castings in which the styrene-diallyl phthalate mixture is used. When the resin from this example is dissolved in 1,3-butyleneglycol dimethacylate to form a 50 percent solution by weight, and this solution mixed with 10 parts titanium dioxide, 10 parts magnesium oxide and one part tertiary-butyl perbenzoate, a composition is produced having value as a top or decorative layer for polyester sheet or bulk molding material. When this material is cured by the application of heat and pressure, it is found to possess a Rockwell hardness on the "E" scale of approximately 85; while a polyester composition containing the same amounts of fillers by weight, was found to have a Rockwell hardness on the "E" scale of approximately 65. This improvement in hardness is beneficial for many applications where abrasion resistance is very important. These castings also show excellent electrical resistance properties.

EXAMPLE III

Melamine-Acrylamide-Formaldehyde Resin

Into a 4-liter flask equipped with a mechanical stirrer, reflux condenser and thermometer, there are added 1,500 gms. of 52 percent aqueous formaldehyde solution and 600 gms. of water. The pH of the solution is adjusted to 7–8 by the addition of 2.5 gms. of triethanol amine. Then there are added 1,240 gms. of melamine and 217 gms. of acrylamide. The mixture is then heated to 90° C. and maintained at this temperature until tests indicate that a drop of the reaction mixture when placed in a beaker of cold water forms a slightly opaque cloud. Then sufficient sodium hydroxide solution is added to adjust the pH of the solution to 10.5–11.5. The reflux condenser is replaced with a distillation condenser and distillate removed under a vacuum of 25 inches of water until a temperature of 90° C. is reached. The reaction mixture is held at this temperature until a product is obtained which has a gradient bar melting point of 194° F. This resin may be easily ground when cool and does not sinter upon standing at room temperature. The yield is 2,215 gms. Its Stroke method cure of 155 seconds at 330° F. is reduced approximately 75 percent by the addition of 0.5 percent benzoyl peroxide (based on weight of resin).

EXAMPLE IV

Benzoguanamine-Vinyl Methyl Ketone-Formaldehyde Resin

Into a 4-liter flask equipped with a reflux condenser, thermometer and mechanical stirrer, there are introduced 1500 gms. of 52 percent aqueous formaldehyde solution and 600 gms. of water. The pH of the solution is adjusted to 7.2–7.6 with approximately 2.5 gms. of triethanol amine. Then 1,830 gms. of benzoguanamine and 213 gms. of vinyl methyl ketone are added. This mixture is heated to 90° C. and held at this temperature until the free formaldehyde in the solution is below 2 percent. Then the pH is adjusted to 10.5–11.5 by the addition of 10 percent sodium hydroxide solution. The reflux condenser is replaced with a distillation condenser and the pressure is gradually reduced to 27 inches of Hg. The distillate is removed until the reaction mixture reaches a temperature of 120° C. and this temperature is maintained until the melting point as determined by the gradient bar method reaches 175° F. The resin is then discharged from the kettle and allowed to cool. A yield of 2,418 gms. is obtained. This resin shows no signs of curing after 5 minutes at 330° F., but on the addition of 0.5 percent benzoyl peroxide, the resin cures to a rigid resin in less than 25 seconds at 330° F.

EXAMPLE V

Preparation of an Allylacetone-Melamine-Formaldehyde Resin

Into a 4-liter resin flask equipped with a reflux condenser, thermometer and mechanical stirrer, is loaded 1,500 gms. (26 moles) of 52 percent aqueous formaldehyde and 600 gms. of water. The pH of this solution is adjusted to the proper range, 1,371 gms. (10.9 moles) of melamine and 532 gms. (5.44 moles) of allylacetone (1-hexene-5-one) are added to the resin flask and the reaction mixture heated to 90° C. When 90° C. is reached sufficient 10 percent sodium hydroxide (25 gms.) is added to bring the pH to 11.5. A slight exothermic reaction is observed and the reaction mixture is maintained at 90° C. for 5 minutes. When the 5 minute holding period is completed the reflux condenser is replaced with a distillation condenser and the pressure slowly reduced to 25 inches of mercury. The distillation is continued until the temperature reaches 65° C. Then the pressure within the vessel is increased to 20 inches of Hg, and the temperature is raised to 90° C. at which time the pressure is again slowly decreased to 26 inches of Hg while keeping the batch temperature at 90° C. The batch is held at this temperature and pressure for 1 hour, then discharged to a cooling tray. The somewhat hygroscopic resin is found to have a gradient bar melting point of 180° F. and a Stroke set time at 330° F. of 180 seconds. When 3 percent dicumylperoxide is added to the resin, the set time at 330° F. is decreased to less than 20 seconds. That the allylacetone had reacted with the methylol melamine is shown by the presence of strong carbonyl absorption at 1715 cm$^{-1}$ in the infrared spectrum of the resin and by material balance calculations which show that 417 gms. (4.28 moles) of allylacetone has reacted with the melamine-formaldehyde adduct or polymer. It is found by separate experiment that allylacetone does not react with formaldehyde alone at the pH of the above reaction, even if it is refluxed for several hours. Upon testing the resin product of this example is found to have excellent electrical resistance properties.

EXAMPLE VI

Preparation of an Allylamine-Melamine Formaldehyde Resin

Into the same apparatus as used in Example V is added 1,500 gms. (26 moles) of 52 percent aqueous formaldehyde and 600 gms. of water. The pH of this solution is adjusted to 7.4 with 3.5 gms. triethanolamine. Then 1,371 (10.9 moles) gms. of melamine is added followed by 99.4 gms. (1.74 moles) of allylamine. As soon as the allylamine is added a substantial exotherm is noted. The batch is heated to 90° C. and sufficient 10 percent sodium hydroxide (25 gms.) is added to adjust the pH to 11.6. As soon as the pH is obtained the pressure is reduced below atmospheric, and distillation continued at 16 inches of Hg to a batch temperature of 85° C., at which point the batch is discharged to cooling trays. The resultant resin is found to have a gradient bar melting point of 280° F. and a set time by the Stroke method of less than 5 seconds. From material balance calculations virtually all materials are accounted for. Consequently, all of the allylamine remains in the product. This is also reflected in the high melt point and short set time of the product which are much higher and much shorter respectively than unmodified melamine-formaldehyde resins.

The above procedure is repeated except that the allylamine is withheld until just prior to the reduction of pressure. The allylamine is added and heating continued for 15 minutes before the pressure is reduced. Similar results are obtained as in the initial procedure.

When the above initial procedure is repeated twice using 2-aminopropene-1 and p-vinyl aniline similar results are obtained.

EXAMPLE VIII

The Preparation of an Acrylamide-Benzoguanamine-Formaldehyde Resin

Into the same apparatus used in Example I there is charged 1,300 gms. (22.5 moles) of 52 percent formaldehyde and 500 gms. of water. The pH of this solution is adjusted to 7.3 with 2 gms. of triethanolamine. Then 1,300 gms. (6.9 moles) benzoguanamine and 355 gms. (5.0 moles) acrylamide are added and the reaction mixture heated to 90° C. at which temperature it is held for 15 minutes. As soon as the holding period is completed 12 gms. of 10 percent sodium hydroxide is added. The pH at this point is 10.0 to 11.0. The reflux condenser is replaced with a vacuum distillation condenser and receiver and distillation effected up to a resin temperature of 90° C. under a reduced pressure of 28 inches of Hg at which point the pressure is further reduced to 25 inches of Hg and distillation continued to a resin temperature of 150° C. When a batch temperature of 150° C. is reached the resin is discharged into clean cooling pans. The melting point of this resin is found to be 215° F. by the gradient bar method and the color is light yellow-green.

This material is found to have a set time by the stroke method at 330° F. in excess of 5 minutes. However, if the resin is blended with 3 percent benzoylperoxide or dicumyl peroxide, the set times are shortened to below 20 seconds which indicates that complete cure can be very efficiently obtained through free radical addition reactions without further use of condensation curing mechanisms.

EXAMPLE IX

The Preparation of a Diacetoneacrylamide-Benzoguanamine-Furfural Resin

Into the same apparatus used in Example I there is charged 2,033 gms. (21.15 moles) of furfural, 2.0 gms. triethanolamine, 400 gms. (2.36 moles) diacetoneacrylamide, and 1424 gms. (7.62 moles) benzoguanamine. This mixture is heated to 100° C. and held at this temperature for one hour. At the end of this period, 8.6 gms. of 10% NaOH is added and distillate removed under a reduced pressure of 28 inches of Hg and up to 100° C. reaction temperature. It is held at 28 inches of Hg and 100° C. for 25 minutes and then discharged into a cooling pan. The yield is found to be 2,570 gms. of dark brown, almost black resin which is found to have a melting point of 190° F. by the gradient bar method and a stroke method set time in excess of 5 minutes at 330° F. In this case the incorporation of 3% benzoylperoxide does not shorten the set time.

TABLE

| Starting materials | Parts |
|---|---|
| Type 88 Polyester Resin (Isophthalate-Propylene Glycol-Maleate: 1.5–3.5–2.5 molar ratio) | 950 |
| Dicumyl peroxide (Suspended on 40% by weight CaCO$_3$) | 42 |
| Lime | 5 |
| Calcium stearate | 40 |
| Dark cotton | 250 |
| 7TF12 Asbestos | 300 |
| KH 31 Alumina | 2000 |
| Resin of Example I | 300 |
| Brown Umber | 2.5 |
| Red Orange 2767 | 1 |
| Cadmium Yellow 2272 | 12 |
| Hoover Brown 9827 | 11 |
| White TiO$_2$ R992 | 27 |

EXAMPLE X

Melamine-Vinylmethyl Ketone Formaldehyde Resin

Into a 4-liter flask equipped with a reflux condenser, thermometer and mechanical stirrer, there are introduced 1,500 gms. (26 moles) of 52 percent aqueous formaldehyde solution and 600 gms. of water. The pH of the solution is adjusted to 7.4–7.7 with approximately 3.5 gms. of triethanolamine. Then 1,371 gms. (10.9 moles) of melamine and 98 gms. (1.40 moles) of vinylmethyl ketone are added. This mixture is heated to 90° C. and held at this temperature for 20 minutes. The pH of the solution is then adjusted to 11.0–11.7 by the addition of 10 percent sodium hydroxide solution. The temperature is held at 90° C. for 10 minutes, the reflux condenser is replaced with a distillation condenser, and the pressure is gradually reduced to 25 inches of Hg. The distillate is removed until the reaction mixture reaches a temperature of 90° C. If desired the vacuum may then be decreased to 22 inches of Hg. The resin is then maintained at 90° C. and 22 inches to 25 inches of Hg until the melting point, as determined by the gradient bar method, is over 180° F. The resin is then discharged from the resin flask and allowed to cool. A yield of 2,241 gms. is obtained and the resin is found to have a gradient bar melting point of 215° F. and a stroke set time at 330° F. of 61–62 seconds. However, the addition of 3% benzoyl peroxide or dicumyl peroxide is found to decrease the set time to 20 seconds.

The resins of this invention are advantageously cured at 25°–400° F., preferably 300°–350° F.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for producing and curing a molding resin of improved curing and electrical resistance characteristics comprising the steps of reacting in an inert liquid medium:

a. a triazine compound selected from the class consisting of melamine and benzoguanamine;

b. an aldehyde selected from the class consisting of formaldehyde, acetaldehyde, chloracetaldehyde and furfuraldehyde; and c. a vinyl compound having the formula

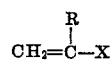

wherein

R is selected from the class consisting of hydrogen and an alkyl group of one to four carbon atoms, and X is a radical selected from the class consisting of:

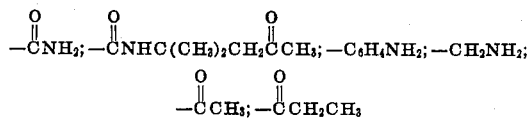

and

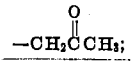

the proportion of said vinyl compound being 0.05–100 moles per mole of said triazine compound, and the proportion of said aldehyde being 0.5–6 moles per mole of said triazine compound with an additional 0.5–5 moles of aldehyde per mole of said vinyl compound; said reaction being conducted at a temperature of 60°–100° C. and a pH in the range of 7–12 and the water being eventually removed from the reaction mass by heating under reduced pressure until the resin product forms a brittle solid mass upon cooling, and thereafter curing said resin product at a temperature of 25°–400° F. in intimate mixture with 0.05–10 percent by weight of a peroxy or azo free-radical-generating catalyst.

2. The process of claim 1 in which said liquid medium is water.

3. The process of claim 2 in which said aldehyde is formaldehyde.

4. The process of claim 3 in which said triazine compound is melamine.

5. The process of claim 4 in which the proportion of said vinyl compound is 0.1–10 moles per mole of melamine and the proportion of said aldehyde is 1.5–2.5 moles per mole of melamine plus an additional 1.5–3 moles per mole of said vinyl compound.

6. The process of claim 5 in which said reaction is effected at a temperature of 85°–95° C., the pH is initially 7–8 and prior to the complete removal of water the pH is adjusted to 10–12.

7. The process of claim 6 in which said vinyl compound is diacetone acrylamide.

8. The process of claim 6 in which said vinyl compound is acrylamide.

9. The process of claim 6 in which said vinyl compound is vinylmethyl ketone.

10. The process of claim 6 in which said vinyl compound is allyl amine.

11. The process of claim 3 in which said triazine compound is benzoguanamine.

12. The process of claim 11 in which said vinyl compound is diacetone acrylamide.

13. The process of claim 1 in which 0.1–5 percent by weight of a peroxy free radical generating catalyst is added to the resin product and the mixture is cured at a temperature of 300°–350° F.

14. The process of claim 1 in which said catalyst is a peroxide selected from the class of benzoyl and dicumyl peroxides.

15. The process of claim 13 in which said resin is admixed with 5–50 percent by weight of styrene prior to said curing step.

16. The process of claim 13 in which said resin is admixed with 5–50 percent by weight of diallyl phthalate prior to said curing step.

17. A resin of improved curing and electrical resistance properties produced according to the process of claim 1.

18. The process of claim 14 in which said curing temperature is 300°–350° F.

* * * * *